2,995,592
ALKOXYDISILOXANES

Robert L. Peeler, Albany, and Steve A. Kovacich, El Cerrito, Calif., assignors to California Research Corporation, San Francisco, Calif., a corporation of Delaware
No Drawing. Filed June 30, 1958, Ser. No. 745,328
5 Claims. (Cl. 260—448.8)

This invention relates to novel alkoxydisiloxanes. More particularly, the invention is concerned with a novel class of dialkyltetraalkoxydisiloxanes having improved properties.

Alkoxydisiloxanes are generally characterized by unusually good viscosity-temperature properties, superior lubricity and low volatility which make them attractive as high-temperature hydraulic fluids and lubricants. A great many of the alkoxydisiloxanes, however, are unstable, particularly at high temperatures and in the presence of water. This instability makes them objectionable for a number of important uses.

We have now discovered a novel class of alkoxydisiloxanes having improved properties, namely, the dialkyltetraalkoxydisiloxanes, wherein the alkyl groups contain from 2 to 12 carbon atoms each and the alkoxy groups contain from 3 to 13 carbon atoms each.

The alkoxydisiloxanes of the present invention possess outstanding properties which are considered desirable for hydraulic fluids and lubricants. Their hydrolytic stability, particularly at high temperatures, is excellent. They are also low in volatility and have excellent viscosity-temperature properties which permit their effective use over a wide range of temperatures.

The dialkyltetraalkoxydisiloxanes of the invention are illustrated by the structural formula:

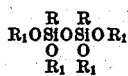

wherein the R's, which may be the same or different from one another, are alkyl groups of from 2 to 12 carbon atoms each, and the $R_1$'s, which may be the same or different from one another, are alkyl groups from 3 to 13 carbon atoms each. Preferably, the R's are alkyl groups of from 2 to 6 carbon atoms, and the $R_1$'s are primary or secondary alkyl groups of from 3 to 10 carbon atoms. Such preferred alkyl groups provide dialkyltetraalkoxydisiloxanes which are unusually stable at high temperatures and in the presence of water.

Dialkyltetraalkoxydisiloxanes illustrative of the invention as described above include:

1,3-diethyl-1,1,3,3-tetra(2-ethylbutoxy)-disiloxane
1,3-diethyl-1,1,3,3-tetra(2,2-dimethyl-pentoxy)disiloxane
1,3-diethyl-1,3,3,3-tetra(2-ethylhexoxy)-disiloxane
1,3-diethyl-1,1,3,3-tetra(2-octoxy)-disiloxane
1,3-dipentyl-1,1,3,3-tetra(2-ethylbutoxy)-disiloxane The novel dialkyltetraalkoxydisiloxanes of the invention are prepared by several different methods. According to the present method, 1 mole of commercially available alkyltrichlorosilane is reacted with 2 moles of alcohol, the alkyl groups of the silane and alcohol being of the type mentioned above. Two moles of the alkyl-dialkoxymonochlorosilane thus obtained are then reacted with 1 mole of water in the presence of an acid acceptor, such as alpha-picoline or pyridine. In the first step of the reaction, cooling is employed during the addition of alcohol to the alkyltrichlorosilane to control the reaction rate. In the second step, the water is added at ordinary room temperatures, followed by heating, usually at reflux temperatures of the alcohols employed in the reaction. Hydrogen chloride formed in the first step as a by-product in the reaction is readily removed by blowing with an inert gas, such as nitrogen. The dialkyltetraalkoxydisiloxane product is conveniently separated from the reaction mixture by conventional means, such as fractional distillation.

The following examples are given as additional illustrations of the preparation of the novel dialkyltetraalkoxydisiloxanes of the invention. Unless otherwise specified, the proportions are given on a weight basis.

EXAMPLE 1

411 grams of pentyltrichlorosilane were placed in a 2-liter reaction flask cooled to —20° C. While holding between —15° and —20° C., 408 grams of 2-ethylbutanol was added in 1½ hours. The mixture was stirred an additional one-half hour at this temperature, and then allowed to warm to room temperature while blowing with nitrogen to remove hydrogen chloride.

At room temperature, 200 ml. alpha-picoline was added. Keeping the temperature below 38° C., 98 ml. water was slowly added. After 2 hours stirring, the lower, aqueous layer was allowed to settle and was discarded. The product was stripped to 300° F. at 20 mm. Hg pressure. The bottoms were then treated with anhydrous ammonia for 4 hours, and blown with nitrogen to remove excess ammonia. The product was distilled through a spinning band column, the fraction boiling at 190° C. to 193° C. at 1 mm. Hg pressure being collected as 1,3-dipentyl-1,1,3,3-tetra(2-ethyl-butoxy)disiloxane.

EXAMPLE 2

327 grams of ethyltrichlorosilane was placed in a 2-liter reaction flask and cooled to —15° C. to —20° C. At this temperature, 520 grams of 2-ethylhexanol was added gradually over 2 hours. The mixture was stirred an additional one-half hour at this temperature and then allowed to warm to room temperature while blowing with nitrogen to remove hydrogen chloride.

At room temperature 200 ml. alpha-picoline was added. Then 100 ml. water was added at such a rate that the temperature did not exceed 38° C. The mixture was stirred one additional hour at room temperature. The lower phase was allowed to settle and was discarded. The product was stripped to 350° F. at 20 mm. The bottoms were treated with anhydrous ammonia for one-half hour, blown with nitrogen until free of ammonia, and filtered. The product was distilled through a spinning band column, the fraction boiling between 211° C. and 214° C. at 1 mm. being collected as 1,3-diethyl-1,1,3,3-tetra(2-ethylhexoxy)disiloxane.

Additional examples of the dialkyltetraalkoxy-disiloxanes according to the invention and related materials for the purpose of comparison were prepared employing the procedures as outlined above. The properties of the dialkyltetraalkoxydisiloxanes are summarized in the following table.

Table I

| Ex. No. | Compound | Boiling point, °C./mm. | Viscosity, cs. | | | ASTM slope, 100/210° F. | Silicon, percent | | Carbon, percent | | Hydrogen, percent | |
|---|---|---|---|---|---|---|---|---|---|---|---|---|
| | | | −65° F. | 100° F. | 210° F. | | Found | Calc. | Found | Calc. | Found | Calc. |
| 1 | 1,3-dipentyl-1,1,3,3-tetra(2-ethylbutoxy)disiloxane. | 190–193/1 | 1,194 | 11.37 | 3.652 | 0.59 | 8.36 | 9.07 | 65.95 | 65.96 | 12.12 | 12.05 |
| 2 | 1,3-diethyl-1,1,3,3-tetra(2-ethylhexoxy)disiloxane. | 211–214/1 | 1,053 | 8.397 | 2.801 | 0.64 | | | 66.78 | 66.81 | 12.36 | 12.15 |
| 3 | 1,3-diethyl-1,1,3,3-tetra(2-ethylbutoxy)disiloxane. | 179–181/1 | 252 | 5.852 | 2.825 | 0.63 | 9.79 | 10.50 | | | | |
| 4 | 1,3-diethyl-1,1,3,3-tetra(2,2-dimethylpentoxy)disiloxane. | 185–190/1 | 2,899 | 11.07 | 3.384 | 0.60 | 9.54 | 9.50 | 64.54 | 65.03 | 11.69 | 11.94 |
| 5 | 1,3-diethyl-1,1,3,3-tetra(2-octoxy)disiloxane. | 222–227/1 | 1,537 | 8.67 | 2.71 | 0.69 | | | 66.58 | 66.81 | 12.10 | 12.15 |
| 6 | 1,3-dimethyl-1,1,3,3-tetra(2,2-dimethylpentoxy)disiloxane. | 175–186/1 | 4,530 | 8.292 | 2.582 | 0.70 | | | 63.77 | 64.00 | 11.91 | 11.82 |
| 7 | 1,1,3,3-tetramethyl-1,3-di(1-decoxy)-disiloxane. | 176–179/1 | Solid | 4.950 | 1.887 | 0.70 | 12.1 | 12.57 | 63.95 | 64.51 | 11.95 | 12.18 |

In the above examples the dimethyl and tetramethyl-alkoxydisiloxanes are included for the purpose of comparative evaluation.

A series of tests was carried out to illustrate the superior properties of the novel dialkyltetraalkoxydisiloxanes of the invention. These tests show their excellent hydrolytic stability at elevated temperatures compared to other alkoxydisiloxanes of the same general type. In the tests 10.00 ml. of the alkoxydisiloxane and 0.60 ml. of water are placed in a 22 ml. nickel bomb. The bomb is closed and rotated at 5 r.p.m. in an oven maintained at 400° F. At the end of the 20 hours the bomb is removed from the oven. The test fluid is taken from the bomb and centrifuged. Following centrifugation the liquid portion is decanted for viscosity measurements. Insolubles remaining after decanting are washed with chloroform, dried, and weighed.

The results of the 20-hour test on the alkoxydisiloxanes of the invention are given in the following table.

For comparison, test results are also included in the table showing the hydrolytic stability of other types of alkoxydisiloxanes.

Table II

| Compound | Viscosity changes, percent at— | | Insolubles, percent |
|---|---|---|---|
| | 100° F. | 210° F. | |
| 1,3-diethyl-1,1,3,3-tetra-(2-ethylbutoxy)disiloxane | +17.3 | −20.0 | 0.01 |
| 1,3-diethyl-1,1,3,3-tetra-(2,2-dimethylpentoxy)disiloxane | −2.8 | −22.4 | 0.06 |
| 1,3-diethyl-1,1,3,3-tetra-(2-ethylhexoxy)disiloxane | +13.0 | −23.0 | 0.02 |
| 1,3-diethyl-1,1,3,3-tetra-(2-octoxy)disiloxane | −1.5 | −28.4 | 0.003 |
| 1,3-dipentyl-1,1,3,3-tetra-(2-ethylbutoxy)disiloxane | −2.2 | −25.9 | 0.13 |
| Hexa(2-ethylbutoxy)disiloxane | −18.4 | −51.4 | 14.1 |
| Hexa(2,2-dimethylbutoxy)disiloxane | | | 8.53 |
| Hexa(2-octoxy)disiloxane | −51.5 | −61.3 | 9.54 |
| 1,3-dimethyl-1,1,3,3-tetra-(2,2-dimethylpentoxy)disiloxane | +211 | +61.7 | 0.65 |
| 1,3-dimethyl-1,1,3,3-tetra-(2-octoxy)disiloxane | −5.4 | −34.6 | 1.17 |

From the above test results, it will be seen that the dialkyltetraalkoxydisiloxanes of the present invention having 2 or more carbon atoms in the alkyl groups are quite stable to hydrolysis at high temperatures. There is very little change in the viscosity of the fluids after prolonged heating at 400° F. in the presence of water. Furthermore, there is very little formation of insolubles. By way of contrast, hexaalkoxydisiloxanes, tetramethyl-dialkoxydisiloxanes, and dimethyltetraalkoxydisiloxanes are shown to be much less stable. Undesirably large changes in viscosity are sustained with such fluids, or the formation of insolubles is unsatisfactorily high in each instance.

The unusual stability of the dialkyltetraalkoxydisiloxanes having 2 or more carbon atoms in the alkyl groups according to the present invention makes them particularly valuable as hydraulic fluids and lubricants in applications where high temperatures are encountered. The fact that they maintain excellent viscosity-temperature properties is especially important, since minimum viscosity changes throughout wide temperature ranges are required. Resistance to the formation of solid particles of silica is also critical, since such abrasive materials obviously interfere with the functioning of hydraulic and lubrication systems.

We claim:

1. Dialkyltetraalkoxydisiloxane having the general structural formula:

wherein the R is ethyl and the $R_1$'s are selected from the class consisting of 2-ethylbutoxy; 2,2-dimethylpentoxy; 2-ethylhexoxy; 2-octoxy.

2. 1,3-diethyl-1,1,3,3-tetra(2-ethylhexoxy)disiloxane.
3. 1,3-diethyl-1,1,3,3-tetra(2-ethylbutoxy)disiloxane.
4. 1,3-diethyl-1,1,3,3 - tetra(2,2 - dimethylpentoxy)-disiloxane.
5. 1,3-diethyl-1,1,3,3-tetra(2-octoxy)disiloxane.

References Cited in the file of this patent

UNITED STATES PATENTS 2,624,749    Bunnell           Jan. 6, 1953

OTHER REFERENCES

Smith: "Chem. Abstracts," vol. 49 (1955), pp. 909–10.
Okawara et al.: "Bull. Chem. Soc. Japan," vol. 27 (1954), pp. 582–85; (Chem. Abstracts, vol. 50 (1956), pp. 162–63).
Peeler et al.: "Ind. and Eng. Chem.," vol. 51 (1959), pp. 749–52.